No. 618,266. Patented Jan. 24, 1899.
B. F. GILMAN.
APPARATUS FOR WORKING FROZEN AURIFEROUS EARTH.
(Application filed Aug. 10, 1897.)
(No Model.)

Witnesses,

Inventor,
Benjamin F. Gilman,
By Dewey & Co.
Atty

UNITED STATES PATENT OFFICE.

BENJAMIN F. GILMAN, OF SAN FRANCISCO, CALIFORNIA.

APPARATUS FOR WORKING FROZEN AURIFEROUS EARTH.

SPECIFICATION forming part of Letters Patent No. 618,266, dated January 24, 1899.

Application filed August 10, 1897. Serial No. 647,679. (No model.)

*To all whom it may concern:*

Be it known that I, BENJAMIN F. GILMAN, a citizen of the United States, residing in the city and county of San Francisco, State of California, have invented an Improvement in Apparatus for Working Frozen Auriferous Earth; and I hereby declare the following to be a full, clear, and exact description of the same.

My invention relates to an apparatus which is especially designed for softening frozen earth, so that it can afterward be excavated.

It consists, essentially, of a furnace with passages or chambers, a means for forcing air through the furnace, so that it may be heated to a high temperature, and means for directing the heated air upon inclosed surfaces of the frozen ground, so that the latter may be thawed and softened sufficiently to be afterward excavated, and in details of construction which will be more fully explained by reference to the accompanying drawings, in which—

Figure 1:
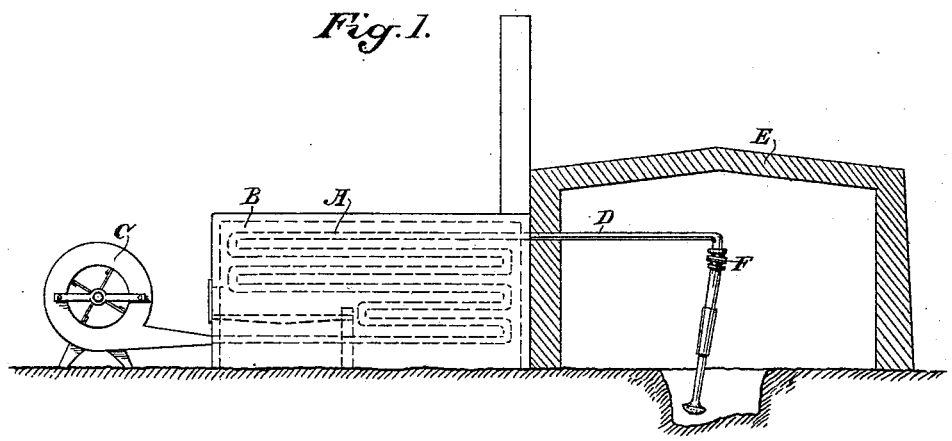
Figure 2:
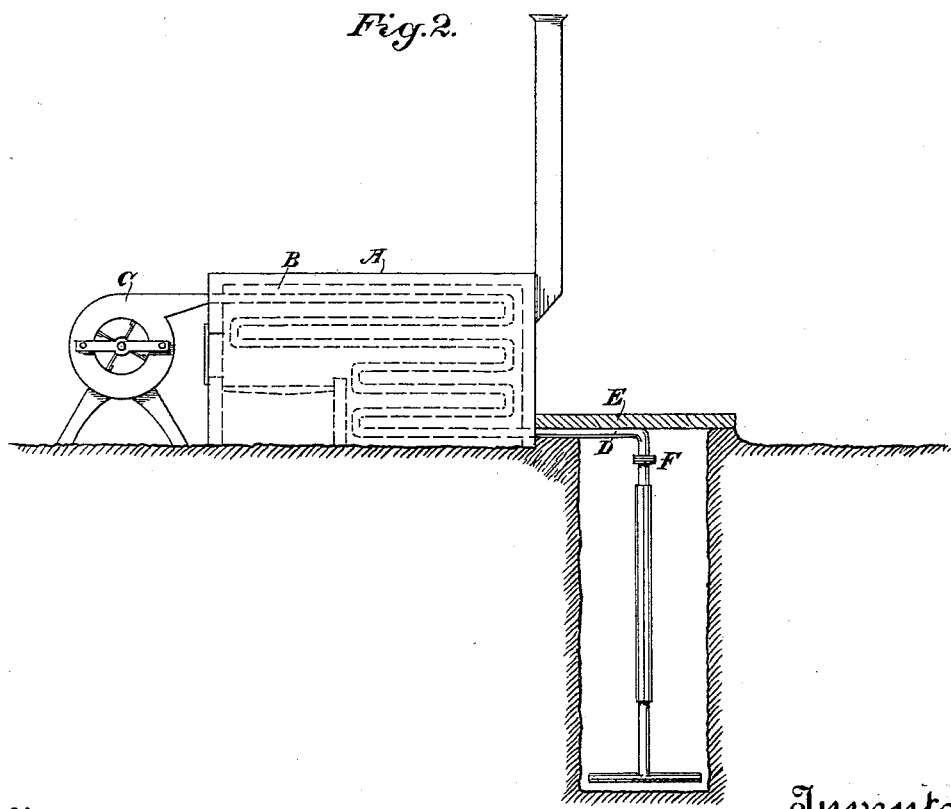

Figures 1 and 2 are views of my device, showing its application.

In high latitudes, where the winter temperature is exceedingly severe, the ground becomes frozen to a very great depth, and the short summer months are insufficient to ever thaw it out. In portions of such territory exceedingly rich placer gold-mines have been discovered, and it has been found impossible to excavate the ground during the summer on account of the excessive amount of water produced by the rapidly-melting snow and ice, which practically floods the whole country, making it necessary to do the excavating during the winter and store the resultant product until the summer brings water enough to wash it. As the winters are so exceedingly severe, the only method that can be adopted would be either by blasting the frozen earth or by other means.

In order to carry on the work of excavation during the winter season, I employ a furnace A, adapted to burn any obtainable fuel. This furnace has passages or chambers B made through it, so as to be exposed to the heat of the fire.

C is an air-forcing apparatus of any suitable description. In the present case I have shown an ordinary fan-blower, which may be driven by manual or other available power, so as to force a constant stream of air through the passages in the furnace, where it will be heated to a high temperature. From the furnace a pipe D conveys the heated air to the point where it is to be used.

On account of the severity of the winter temperature in these high latitudes it would be necessary to inclose the surface which is to be operated on. I have therefore shown an inclosure E, which may be built of earth, rocks, timber, or other available material and of sufficient size to inclose the portion of ground upon which it is desired to operate, or it may be the shaft or excavation itself. The hot-air-supply pipes are led into this inclosure and may have one or more discharge-nozzles and flexible or universal joint couplings, if required, as shown at F, by which the nozzles can be moved about and directed against the surface of the ground at any desired point. In addition to this the inclosure will prevent the air from being rapidly cooled, so that the general temperature within it will be maintained sufficiently high to prevent the refreezing of the ground whenever the heat is removed from any particular point. It also maintains a temperature within which the workmen can be protected from the severe cold. The earth being thawed and softened by the heat thus applied can be excavated either continuously or at intervals, as may be found necessary or desirable.

Whenever the shaft or excavation has been made to some depth, the heat may be confined more closely therein, so as to raise the temperature to a very high degree, and after the shaft has once been commenced it may form the only inclosure necessary by simply covering the top to prevent the escape of the hot air.

If the heat within the shaft is too intense to allow of continuous work, it is only necessary to continue the heat until the portion of the surface has been thawed and softened. Then the heat may be shut off and the softened ground excavated until the point is reached where the ground is too hard for further excavation, when the heat can be again turned on and the work thus continued, the material being stored until the summer, when it can be washed. In this manner the work of excavating can be continued throughout the cold season.

Having thus described my invention, what I claim as new, and desire to secure by Letters Patent, is—

In an apparatus of the character described, for thawing frozen earth or gravel *in situ*, a means for applying heat directly to the surface and maintaining it in contact therewith, consisting of a furnace, an air-forcing mechanism, a substantially tight working inclosure for the operators said inclosure surrounding the surface to be thawed, a pipe leading from the furnace into the inclosure, for conducting the heat thereto, a jet-pipe within the inclosure having a horizontal series of jets or discharge-passages, and a flexible joint within the inclosure, connecting the conveying-pipe with the movable jet-pipe.

In witness whereof I have hereunto set my hand.

BENJAMIN F. GILMAN.

Witnesses:
S. H. NOURSE,
JESSE C. BRODIE.